United States Patent
Gillick et al.

(10) Patent No.: US 9,619,457 B1
(45) Date of Patent: Apr. 11, 2017

(54) TECHNIQUES FOR AUTOMATICALLY IDENTIFYING SALIENT ENTITIES IN DOCUMENTS

(71) Applicant: Google Inc., Mountain View, CA (US)

(72) Inventors: Daniel Gillick, Oakland, CA (US); Amarnag Subramanya, Sunnyvale, CA (US)

(73) Assignee: GOOGLE INC., Mountain View, CA (US)

( * ) Notice: Subject to any disclaimer, the term of this patent is extended or adjusted under 35 U.S.C. 154(b) by 232 days.

(21) Appl. No.: 14/332,996

(22) Filed: Jul. 16, 2014

Related U.S. Application Data

(60) Provisional application No. 62/008,961, filed on Jun. 6, 2014.

(51) Int. Cl.
*G06F 17/27* (2006.01)
*G06K 9/00* (2006.01)

(52) U.S. Cl.
CPC ..... *G06F 17/2765* (2013.01); *G06K 9/00442* (2013.01)

(58) Field of Classification Search
CPC .......... G06F 17/20; G06F 17/21; G06F 17/27; G06F 17/278
USPC ...................................................... 704/9, 10
See application file for complete search history.

(56) References Cited

U.S. PATENT DOCUMENTS

| | | | |
|---|---|---|---|
| 6,185,592 B1 | 2/2001 | Boguraev et al. | |
| 8,417,569 B2* | 4/2013 | Gross | G06F 17/30861 705/14.41 |
| 8,843,536 B1* | 9/2014 | Elbaz | G06F 17/30887 705/26.1 |
| 2003/0191625 A1 | 10/2003 | Gorin et al. | |

(Continued)

FOREIGN PATENT DOCUMENTS

WO 2014035407 A 3/2014

OTHER PUBLICATIONS

Dunietz, Jesse, and Daniel Gillick. 14$^{th}$ Conference of the European CHapter of the Association for Computational Linguistics."A New Entity Salience Task with Millions of Training Examples." pp. 205-209, EACL. 2014.*

(Continued)

*Primary Examiner* — Paras D Shah
(74) *Attorney, Agent, or Firm* — Remarck Law Group PLC

(57) ABSTRACT

A computer-implemented technique can include obtaining a training corpus including pairs of (i) documents and (ii) corresponding abstracts. The technique can include identifying a set of entity mentions in each abstract and each corresponding document based on their respective part-of-speech (POS) tags and dependency parses. The technique can include clustering the sets of entity mentions referring to a same underlying entity to obtain clusters for each document and each corresponding abstract. The technique can include aligning specific abstract entity mentions to corresponding document entity mentions to obtain a set of aligned (Continued)

abstract and document entities. The technique can include labeling the set of aligned entities as salient and unaligned entities as non-salient to generate a labeled corpus. The technique can also include training features of a classifier using the labeled corpus to obtain a trained classifier.

20 Claims, 2 Drawing Sheets

(56) References Cited

U.S. PATENT DOCUMENTS

| | | | | |
|---|---|---|---|---|
| 2007/0016398 | A1* | 1/2007 | Buchholz | G06F 17/2705 704/4 |
| 2007/0162396 | A1* | 7/2007 | Goldman | G06F 17/30873 705/51 |
| 2009/0144609 | A1* | 6/2009 | Liang | G06F 17/21 715/230 |
| 2009/0272012 | A1* | 11/2009 | Kelly | A43C 15/164 36/127 |
| 2009/0326923 | A1* | 12/2009 | Yan | G06F 17/278 704/9 |
| 2010/0138216 | A1* | 6/2010 | Tanev | G06F 17/2765 704/9 |
| 2011/0093331 | A1* | 4/2011 | Metzler | G06F 17/30864 705/14.49 |
| 2011/0276322 | A1* | 11/2011 | Sandor | G06F 17/2235 704/9 |
| 2013/0204611 | A1* | 8/2013 | Tsuchida | G06F 17/3069 704/9 |
| 2013/0311467 | A1* | 11/2013 | Galle | G06F 17/2795 707/737 |
| 2014/0019541 | A1* | 1/2014 | Zhou | H04L 67/02 709/204 |
| 2014/0195884 | A1* | 7/2014 | Castelli | G06F 17/278 715/201 |
| 2014/0279730 | A1* | 9/2014 | Gamon | G06F 17/30864 706/12 |
| 2014/0372102 | A1* | 12/2014 | Hagege | G06F 17/278 704/9 |

OTHER PUBLICATIONS

Gamon, M. et al., "Identifying Salient Entities in Web Pages," CIKM '13 Proceedings of the 22nd ACM international Conference on Conference on Information & Knowledge Management, 2013, pp. 2375-2380.

* cited by examiner

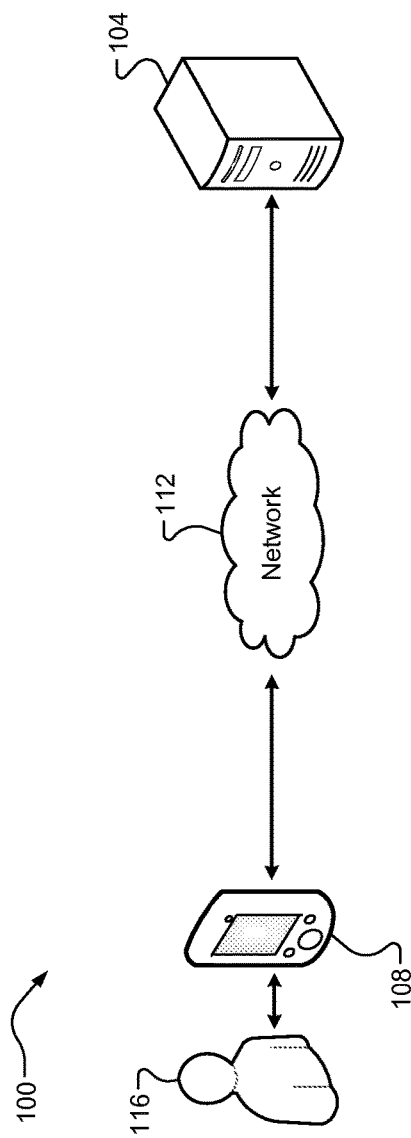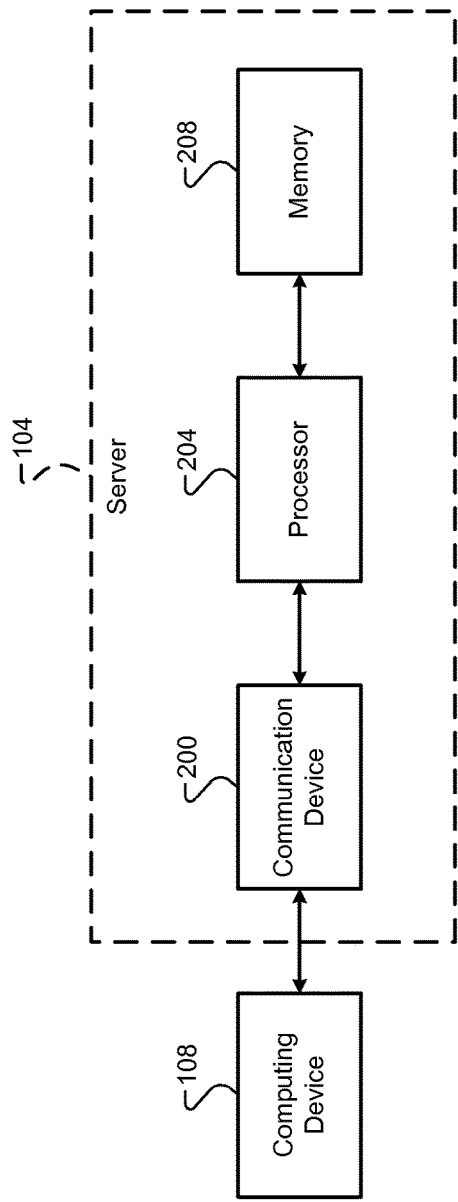

TECHNIQUES FOR AUTOMATICALLY IDENTIFYING SALIENT ENTITIES IN DOCUMENTS

CROSS-REFERENCE TO RELATED APPLICATIONS

This application claims the benefit of U.S. Provisional Application No. 62/008,961, filed on Jun. 6, 2014. The entire disclosure of the above application is incorporated herein by reference.

FIELD

The present disclosure relates generally to natural language processing and, more particularly, to techniques for automatically identifying salient entities in documents.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Conventional natural language processing (NLP) systems treat documents as collections of keywords. In one approach, sequences of n (usually contiguous) words (n-grams) are identified, but it may be difficult to identify the relevant n-grams. An alternative to this n-gram based approach is an entity centric approach. Examples of entities include people, places, companies, events, and concepts. One problem with the entity centric approach, however, is determining the salience (e.g., the prominence) of each entity. The salience of a specific entity can be indicative of its prominence within the document, which is not to be confused with entity importance, which is outside the scope of the document, and entity relevance, which is subjective to the reader of the document. The salience of a specific entity, therefore, can be important for accurately parsing the document.

SUMMARY

A computer-implemented technique is presented. The technique can include obtaining, at a server having one or more processors, a training corpus including pairs of (i) documents and (ii) abstracts, each abstract representing a summary of a corresponding document. The technique can include obtaining, at the server, part-of-speech (POS) tags and dependency parses for each abstract and each corresponding document. The technique can include identifying, at the server, a set of entity mentions in each abstract and each corresponding document based on their respective POS tags and dependency parses. The technique can include clustering, at the server, the sets of entity mentions referring to a same underlying entity to obtain clusters for each document and each corresponding abstract. The technique can include aligning, at the server, specific abstract entity mentions to corresponding document entity mentions to obtain a set of aligned abstract and document entities. The technique can include labeling, at the server, the set of aligned entities as salient and unaligned entities as non-salient to generate a labeled corpus. The technique can also include training, at the server, features of a classifier using the labeled corpus to obtain a trained classifier.

In some embodiments, the identification of specific abstract entities and specific document entities is limited to those having at least one proper name mention.

In some embodiments, aligning a specific abstract entity to a specific document entity requires that one of the abstract entity mentions shares a syntactic head token with one of the document entity mentions.

In some embodiments, the technique further includes ranking, at the server, the set of aligned entities according to their salience to obtain a ranked list of aligned entities, wherein the labeled corpus is generated using the ranked list of aligned entities.

In some embodiments, the dependency parses are obtained using a probabilistic dependency parser.

In some embodiments, the entity mentions are identified using a noun phrase (NP) extractor.

In some embodiments, the entity mentions referring to a single entity are clustered together using a co-reference resolver.

In some embodiments, the abstract entities and the document entities are linked to specific entities in a database of well-known entities by an entity resolver.

In some embodiments, the technique further includes: generating, at the server, a model including the trained classifier, applying, by the server, the model to a collection of documents to obtain salience estimates, and utilizing, by the server, the salience estimates to generate an output.

In some embodiments, the technique further includes, for a given input document that does not have an abstract, utilizing, by the server, the model to at least one of (i) score each entity in the given input document with a salience value and (ii) rank each entity in the given input document according to its salience.

A server is also presented. The server can have one or more processors configured to perform operations including obtaining a training corpus including pairs of (i) documents and (ii) abstracts, each abstract representing a summary of a corresponding document. The operations can include obtaining POS tags and dependency parses for each abstract and each corresponding document. The operations can include identifying a set of entity mentions in each abstract and each corresponding document based on their respective POS tags and dependency parses. The operations can include clustering the sets of entity mentions referring to a same underlying entity to obtain clusters for each document and each corresponding abstract. The operations can include aligning specific abstract entity mentions to corresponding document entity mentions to obtain a set of aligned abstract and document entities. The operations can include labeling the set of aligned entities as salient and unaligned entities as non-salient to generate a labeled corpus. The operations can include training features of a classifier using the labeled corpus to obtain a trained classifier.

In some embodiments, the identification of specific abstract entities and specific document entities is limited to those having at least one proper name mention.

In some embodiments, aligning a specific abstract entity to a specific document entity requires that one of the abstract entity mentions shares a syntactic head token with one of the document entity mentions.

In some embodiments, the operations further include ranking the set of aligned entities according to their salience to obtain a ranked list of aligned entities, wherein the labeled corpus is generated using the ranked list of aligned entities.

In some embodiments, the dependency parses are obtained using a probabilistic dependency parser.

In some embodiments, the entity mentions are identified using an NP extractor.

In some embodiments, the entity mentions referring to a single entity are clustered together using a co-reference resolver.

In some embodiments, the abstract entities and the document entities are linked to specific entities in a database of well-known entities by an entity resolver.

In some embodiments, the operations further include: generating a model including the trained classifier, applying the model to a collection of documents to obtain salience estimates, and utilizing, by the server, the salience estimates to generate an output.

In some embodiments, the operations further include, for a given input document that does not have an abstract, utilizing the model to at least one of (i) score each entity in the given input document with a salience value and (ii) rank each entity in the given input document according to its salience.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 1 is a diagram of a computing network including an example server according to some implementations of the present disclosure;

FIG. 2 is a functional block diagram of the example server of FIG. 1; and

DETAILED DESCRIPTION

Figure 3:
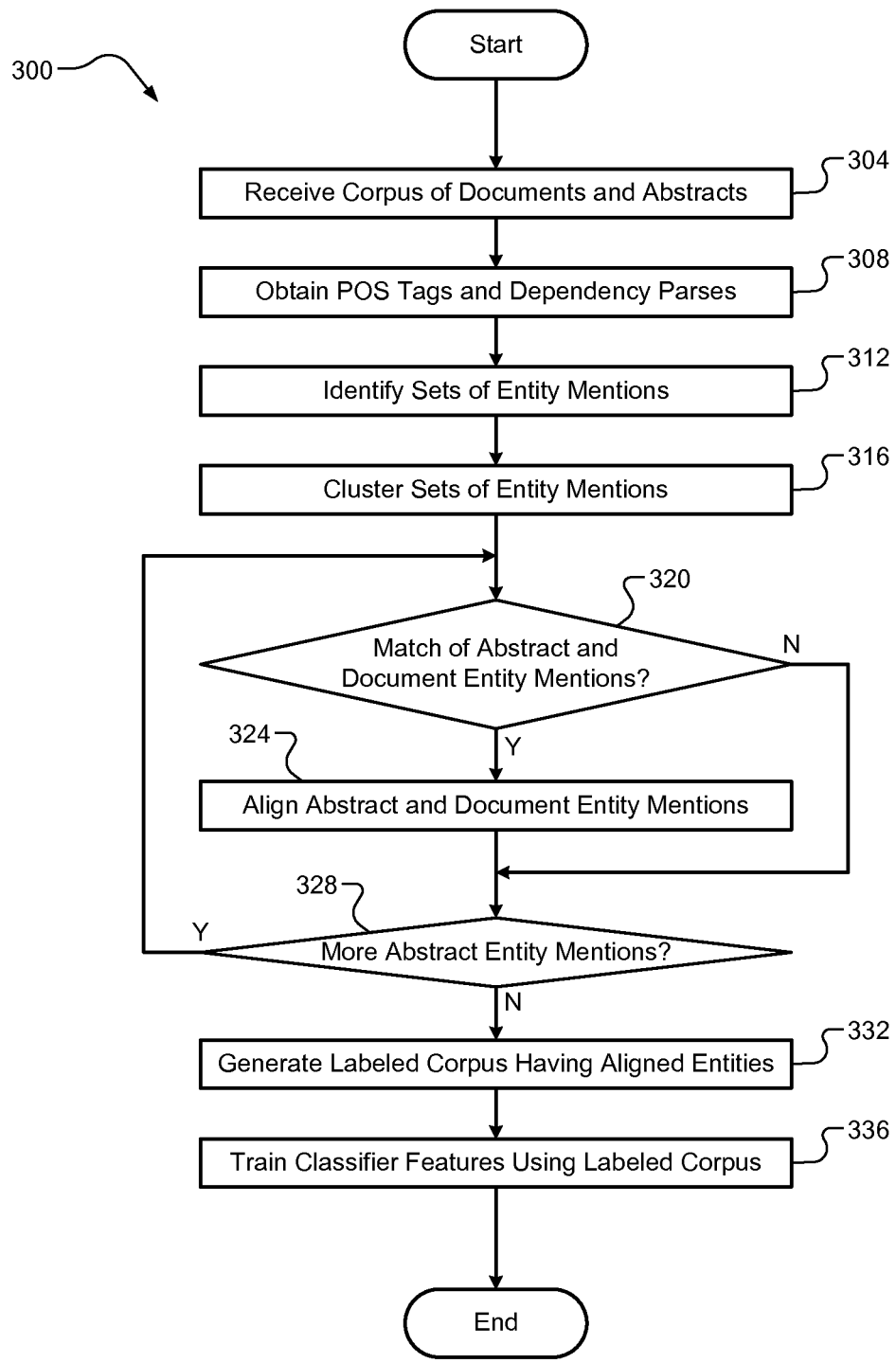
FIG. 3 is a flow diagram of an example technique for automatically identifying salient entities in documents according to some implementations of the present disclosure.

As mentioned above, there remains a need for improvement in the art of salient entity identification. Conventional techniques can describe documents with salient keywords. Salient entities may be of interest because they may better capture underlying content. However, training a classifier can require labeled training data. Accordingly, instead of manually annotating documents with entity salience, which can be time consuming and sometimes error prone, techniques are presented for automatically aligning entities in documents and abstracts to create similar labeled training data. The techniques can include automatically constructing a labeled corpus that is labeled with entity salience using a training corpus of documents each having a corresponding abstract or other suitable summary portion. This can rely on the assumption that salient entities in the document will also be mentioned in the abstract.

The term "entity" as used herein can refer to cluster of noun phrases ("mentions") in the document and/or the abstract that is being classified as salient or not salient. The techniques can include training an entity salience model using features derived from a co-reference resolution system, which can outperform a baseline model based on sentence position. In some implementations, the techniques can further include leveraging background information about entities and their relationships external to the documents/abstracts. In one implementation, for a given input document that does not have an abstract, the techniques can further include utilizing the model to at least one of (i) score each entity in the given input document with a salience value and (ii) rank each entity in the given input document according to its salience.

Referring now to FIG. 1, a diagram of a computing network 100 is illustrated. The computing network 100 can include an example server 104 according to some implementations of the present disclosure. It will be appreciated that the term "server" as used herein can refer to a hardware computer server, including both a single hardware computer server and a plurality of hardware computer servers operating in a parallel or distributed architecture. The server 104 can communicate with a computing device 108 via a network 112. The network 112 can include a local area network (LAN), a wide area network (WAN), e.g., the Internet, or a combination thereof. Examples of the computing device 108 include a server, a desktop computer, a laptop computer, a tablet computer, and a mobile phone. In some implementations, a user 116 can interact with the computing device 108, such as to provide an input that is transmitted to the server 104 via the network 112. The server 104 can be configured to perform at least a portion of the techniques of the present disclosure, which are discussed in greater detail below.

Referring now to FIG. 2, a functional block diagram of the example server 104 is illustrated. The server 104 can include a communication device 200, a processor 204, and a memory 208. The communication device 200 can include any suitable components (e.g., a transceiver) configured for communication via the network 112. The processor 204 can control operation of the server 204, including, but not limited to, controlling communication via the communication device 200 and controlling read/write operations at the memory 208. The memory 208 can be any suitable storage medium (flash, hard disk, etc.) configured to store information at the server 104. It will be appreciated that the term "processor" as used herein can refer to both a single processor and a plurality of processors operating in a parallel or distributed architecture. The processor 204 can also perform at least a portion of the techniques of the present disclosure, which are now discussed in greater detail.

Initially, the server 104 can obtain a training corpus of documents each having a corresponding abstract. This training corpus of documents can represent a collection of many documents (e.g., millions of documents). For purposes of simplicity, a single document and a single abstract will be referred to from hereon, but this processing can be performed for each document-abstract pair of the training corpus. The term "abstract" as used herein can refer to an abstract of a document, such as an abstract of a scientific or technical paper, or any suitable summary of a document that is significantly shorter than the document itself. A standard natural language processing (NLP) pipeline can be run on both the abstract and the document. Specifically, the server 104 can obtain part-of-speech (POS) tags and dependency parses for each abstract and document. The POS tags and/or the dependency parses can be obtained remotely (e.g., from one or more other servers) or locally at the server 104. In one implementation, the dependency parses can be obtained using a probabilistic dependency parser.

The server 104 can identify a set of entity mentions in each of the abstract and the document based on their respective POS tags and dependency parses. As previously described, the term "entity" can refer to a cluster of mentions in the document and/or the abstract that is being classified as salient or not salient. In one implementation, the mentions can be identified using a noun phrase (NP) extractor that uses the POS tags and edges of the dependency parses. The server 104 can cluster the sets of mentions referring to a same entity for each abstract and document. In one implementation, mentions referring to a single entity are clustered together using a co-reference resolver.

Features derived from a co-reference system can be more robust than simple word count features of conventional keyword extraction systems. Moreover, these features can be combined with positional features and (optionally) other features to provide a large improvement over a first-sentence baseline. In one implementation, the server 104 can limit the identification of specific abstract entities and specific document entities to those having at least one proper name mention. In one implementation, the abstract entities and the document entities can be identified using an entity resolver that links specific entities to a database of well-known entities. Examples of this database include web-based entity databases having user-generated profiles for well-known entities. The server 104 can align specific abstract entity mentions to corresponding document entity mentions to obtain a set of aligned abstract and document entities. In one implementation, in order to align a specific abstract entity and a specific document entity, the server 104 may require that one of the abstract entity mentions shares a syntactic head token with one of the document entity mentions. In some implementations, the server can align the abstract entities and the document entities by identifying entities (mention clusters) in abstract-document pairs, and then specific abstract entities can be aligned to specific document entities when they have a matching mention or, in some cases, just a syntactic head match. This alignment process can be implemented using the following algorithm.

For example, let $M_E$ be the set of entity mentions E that are proper names. An abstract entity $E_A$ can align to a document entity $E_D$ if the syntactic head token of some entity mention in $M_{E_A}$ matches the head token of some entity mention in $M_{E_D}$. Then, if the abstract entity $E_A$ aligns with more than one document entity, the abstract entity $E_A$ can be aligned with the document entity that occurs earliest in the document. Alignment complexity may be avoided by aligning only entities with at least one proper-name mention, for which there may be little ambiguity. In contrast, generic entities, such as "CEO" or "state" are often more ambiguous, so aligning these generic entities could be a difficult task. The set of aligned entities can represent a binary classification where each aligned entity in the document is labeled as salient and each unaligned entity in the document is labeled as non-salient. In some implementations, however, a salience ranking over entities may be induced instead of the binary classification.

The server 104 can label the set of aligned entities in the training corpus as salient to generate a labeled corpus. In one implementation, the server 104 can rank the set of aligned entities according to their salience to obtain a ranked set of aligned entities, and the server 104 can generate the labeled corpus based on this ranked set of aligned entities. The server 104 can train features of a classifier using the labeled corpus. A classifier with trained feature weights can be referred to as a trained classifier. The server 104 can utilize the trained classifier for web-based information retrieval and summarization, as well as for web-based advertising. For example, the server 104 can generate a model representing the trained classifier, but it should be appreciated that the terms "classifier" and "model" can be used interchangeably. In one implementation, the model can be a regularized binary logistic regression model that can be used to predict whether a particular entity is salient. To simplify feature selection and to add further regularization, hashing can be utilized to randomly map each feature string to an integer.

Various feature classes can be used. Each individual feature in the model can be a binary indicator. In one implementation, count features can be bucketed by applying the function $f(x)=\text{round}(\log(k(x+1)))$, where k can be used to control the number of buckets. For example only, k may be set to ten. In one example implementation, the feature classes can be the following:

| Feature Name | Feature Description |
| --- | --- |
| 1st-loc | Index of a sentence in which a first mention of an entity appears |
| head-count | Number of times a head word of an entity's first mention appears |
| mentions | Conjunction of a number of named, nominal, pronominal, and total mentions of an entity |
| headline | POS tag of each word that appears in at least one mention of an entity and also in a headline |
| head-lex | Lowercased head word of a first mention of an entity |

Examples of named, nominal, and pronominal mentions are "Barack Obama," "president," and "he," respectively. The total number of mentions can be a total number of times a specific entity is mentioned in a specific document, including all named, nominal, and pronominal mentions.

The server 104 can then utilize the model (also referred to as an "entity salience model") to predict whether a particular entity is salient or not. More specifically, the server 104 could apply the model to a collection of documents to obtain salience estimates, and then utilize the salience estimates to generate an output. For example, the salience estimates could be obtained for a collection of web documents associated with the user 116, such as their browsing history, and then the salience estimates could utilized by the server 104 to predict which advertisements should be displayed to the user 116 at their computing device 108.

Referring now to FIG. 3, a flow diagram of an example technique 300 for automatically identifying salient entities in documents is illustrated. At 304, the server 104 can obtain a training corpus of documents and abstracts. For purposes of simplicity, processing of (i) a single document and (ii) a single abstract representing a summary of the document are described. For example, the server 104 may obtain the document and its abstract from another database, such as at another server, via the network 112. At 308, the server 104 can obtain part-of-speech (POS) tags and dependency parses for each of the abstract and the document. The server 104 may obtain the POS tags and/or dependency parses itself, or the server 104 could obtain the POS tags and/or the dependency parses from another system, such as another server, via the network 112. In one implementation, the dependency parses are obtained using a probabilistic dependency parser. At 312, the server 104 can identify a set of entity mentions in each of the abstract and the document based on their respective POS tags and dependency parses. In one implementation, the server 104 can utilize an NP extractor to identify entity mentions. At 316, the server 104 can cluster the entity mentions to obtain clusters of entity mentions for each of the abstract and the document. In one implementation, entity mentions referring to a single entity are clustered by the server 104 using a co-reference resolver.

At 320, the server 104 can determine whether a specific abstract entity mention matches one or more document entity mentions. If the specific abstract entity mention matches one or more document entity mentions, the server 104 can align the specific abstract entity with the document entity at 324. The technique 300 can then proceed to 328. If the specific abstract entity mention does not match any document entity mentions, however, no alignment can occur and the technique 300 can proceed to 328. At 328, the server 104 can determine whether there are any more abstract entity mentions to process for possible alignment. If there are more abstract entity mentions to process for possible alignment, the technique 300 can return to 320. If there are no more abstract entity mentions to process for possible alignment, alignment is complete and the technique 300 can proceed to 332. At 332, the server 104 can generate a labeled corpus having the set of aligned entities labeled as salient. In other words, the labeled corpus can represent a salient entity labeled version of the training corpus. At 336, the server 104 can train features of a classifier using the labeled corpus. The trained classifier may then be incorporated into a model. For example, the model may be utilized to obtain salience estimates for a collection of documents, which can then be used to generate an output. The technique 300 can then end or return to 304.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known procedures, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The term "and/or" includes any and all combinations of one or more of the associated listed items. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

As used herein, the term module may refer to, be part of, or include: an Application Specific Integrated Circuit (ASIC), an electronic circuit; a combinational logic circuit; a field programmable gate array (FPGA), a processor or a distributed network of processors (shared, dedicated, or grouped) and storage in networked clusters or datacenters that executes code or a process; other suitable components that provide the described functionality; or a combination of some or all of the above, such as in a system-on-chip. The term module may also include memory (shared, dedicated, or grouped) that stores code executed by the one or more processors.

The term code, as used above, may include software, firmware, byte-code and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein, and any references to specific languages are provided for disclosure of enablement and best mode of the present invention.

The present disclosure is well suited to a wide variety of computer network systems over numerous topologies. Within this field, the configuration and management of large networks comprise storage devices and computers that are communicatively coupled to dissimilar computers and storage devices over a network, such as the Internet.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method, comprising:
    obtaining, at a server having one or more processors, a training corpus including pairs of (i) documents and (ii) abstracts, each abstract representing a summary of a corresponding document;
    obtaining, at the server, part-of-speech (POS) tags and dependency parses for each abstract and each corresponding document;
    identifying, at the server, a set of entity mentions in each abstract and each corresponding document based on their respective POS tags and dependency parses;
    clustering, at the server, the sets of entity mentions referring to a same underlying entity to obtain clusters for each document and each corresponding abstract;
    aligning, at the server, specific abstract entity mentions to corresponding document entity mentions to obtain a set of aligned abstract and document entities;
    labeling, at the server, the set of aligned entities as salient and unaligned entities as non-salient to generate a labeled corpus;
    training, at the server, features of a classifier using the labeled corpus to obtain a trained classifier and generating, at the server, a model including the trained classifier, wherein the features include count features indicative of at least one of entity mentions and entity head word mentions, and wherein the training and generating further comprises bucketing, by the server, the count features by applying a function to the count features, wherein the function is:

$f(x) = \text{round}(\log(k(x+1)))$, where x represents a particular count feature and k controls the number of buckets;
    applying, at the server, the model to a collection of documents to obtain the salience estimates, the collection of documents representing a web browsing history of a user of a computing device;
    utilizing, at the server, the salience estimates to obtain a prediction of an advertisement that should be displayed to the user; and
    outputting, from the server and to the computing device via a network, the prediction, wherein receipt of the prediction causes the computing device to display the advertisement to the user.

2. The computer-implemented method of claim 1, wherein the identification of specific abstract entities and specific document entities is limited to those having at least one proper name mention, and wherein aligning a specific abstract entity to a specific document entity requires that one of the abstract entity mentions shares a syntactic head token with one of the document entity mentions.

3. The computer-implemented method of claim 1, further comprising ranking, at the server, the set of aligned entities according to their salience to obtain a ranked list of aligned entities, wherein the labeled corpus is generated using the ranked list of aligned entities.

4. The computer-implemented method of claim 1, wherein the dependency parses are obtained using a probabilistic dependency parser.

5. The computer-implemented method of claim 1, wherein the entity mentions are identified using a noun phrase (NP) extractor.

6. The computer-implemented method of claim 1, wherein the entity mentions referring to a single entity are clustered together using a co-reference resolver.

7. The computer-implemented method of claim 1, wherein the abstract entities and the document entities are linked to specific entities in a database of well-known entities using an entity resolver.

8. The computer-implemented method of claim 1, further comprising, for a given input document that does not have an abstract, utilizing, by the server, the model to at least one of (i) score each entity in the given input document with a salience value and (ii) rank each entity in the given input document according to its salience.

9. A server having one or more processors configured to perform operations comprising:
    obtaining a training corpus including pairs of (i) documents and (ii) abstracts, each abstract representing a summary of a corresponding document;
    obtaining part-of-speech (POS) tags and dependency parses for each abstract and each corresponding document;
    identifying a set of entity mentions in each abstract and each corresponding document based on their respective POS tags and dependency parses;
    clustering the sets of entity mentions referring to a same underlying entity to obtain clusters for each document and each corresponding abstract;

aligning specific abstract entity mentions to corresponding document entity mentions to obtain a set of aligned abstract and document entities;

labeling the set of aligned entities as salient and unaligned entities as non-salient to generate a labeled corpus;

training features of a classifier using the labeled corpus to obtain a trained classifier and generating a model including the trained classifier, wherein the features include count features indicative of at least one of entity mentions and entity head word mentions, and wherein the training and generating further comprises bucketing the count features by applying a function to the count features, wherein the function is:

$$f(x)=\mathrm{round}(\log(k(x+1))),$$

where x represents a particular count feature and k controls the number of buckets;

applying the model to a collection of documents to obtain the salience estimates, the collection of documents representing a web browsing history of a user of a computing device;

utilizing the salience estimates to obtain a prediction of an advertisement that should be displayed to the user; and outputting, to the computing device via a network, the prediction, wherein receipt of the prediction causes the computing device to display the advertisement to the user.

10. The server of claim 9, wherein the identification of specific abstract entities and specific document entities is limited to those having at least one proper name mention, and wherein aligning a specific abstract entity to a specific document entity requires that one of the abstract entity mentions shares a syntactic head token with one of the document entity mentions.

11. The server of claim 9, wherein the operations further comprise ranking the set of aligned entities according to their salience to obtain a ranked list of aligned entities, wherein the labeled corpus is generated using the ranked list of aligned entities.

12. The server of claim 9, wherein the dependency parses are obtained using a probabilistic dependency parser.

13. The server of claim 9, wherein the entity mentions are identified using a noun phrase (NP) extractor.

14. The server of claim 9, wherein entity mentions referring to a single entity are clustered together using a co-reference resolver.

15. The server of claim 9, wherein the abstract entities and the document entities are linked to specific entities in a database of well-known entities using an entity resolver.

16. The server of claim 9, wherein the operations further comprise, for a given input document that does not have an abstract, utilizing the model to at least one of (i) score each entity in the given input document with a salience value and (ii) rank each entity in the given input document according to its salience.

17. A non-transitory, computer-readable medium having a set of instructions stored thereon that, when executed by one or more processors of a server, causes the server to perform operations comprising:

obtaining a training corpus including pairs of (i) documents and (ii) abstracts, each abstract representing a summary of a corresponding document;

obtaining part-of-speech (POS) tags and dependency parses for each abstract and each corresponding document;

identifying a set of entity mentions in each abstract and each corresponding document based on their respective POS tags and dependency parses;

clustering the sets of entity mentions referring to a same underlying entity to obtain clusters for each document and each corresponding abstract;

aligning specific abstract entity mentions to corresponding document entity mentions to obtain a set of aligned abstract and document entities;

labeling the set of aligned entities as salient and unaligned entities as non-salient to generate a labeled corpus;

training features of a classifier using the labeled corpus to obtain a trained classifier and generating a model including the trained classifier, wherein the features include count features indicative of at least one of entity mentions and entity head word mentions, and wherein the training and generating further comprises bucketing the count features by applying a function to the count features, wherein the function is:

$$f(x)=\mathrm{round}(\log(k(x+1))),$$

where x represents a particular count feature and k controls the number of buckets;

applying the model to a collection of documents to obtain the salience estimates, the collection of documents representing a web browsing history of a user of a computing device;

utilizing the salience estimates to obtain a prediction of an advertisement that should be displayed to the user; and outputting, to the computing device via a network, the prediction, wherein receipt of the prediction causes the computing device to display the advertisement to the user.

18. The computer-readable medium of claim 17, wherein the identification of specific abstract entities and specific document entities is limited to those having at least one proper name mention, and wherein aligning a specific abstract entity to a specific document entity requires that one of the abstract entity mentions shares a syntactic head token with one of the document entity mentions.

19. The computer-readable medium of claim 17, wherein the operations further comprise ranking the set of aligned entities according to their salience to obtain a ranked list of aligned entities, wherein the labeled corpus is generated using the ranked list of aligned entities.

20. The computer-readable medium of claim 17, wherein the operations further comprise, for a given input document that does not have an abstract, utilizing the model to at least one of (i) score each entity in the given input document with a salience value and (ii) rank each entity in the given input document according to its salience.

* * * * *